US012483990B2

(12) United States Patent
Singh et al.

(10) Patent No.: US 12,483,990 B2
(45) Date of Patent: Nov. 25, 2025

(54) METHODS AND PROCEDURES FOR EXTENDED BATTERY LIFE

(71) Applicant: Apple Inc., Cupertino, CA (US)

(72) Inventors: Ajoy K Singh, Milpitas, CA (US); Forest A Hill, Lafayette, CO (US); Ajay Kumar S Gupta, Sunnyvale, CA (US); Prathyusha Pallerlamudi, San Jose, CA (US); Sergey Sitnikov, San Jose, CA (US); Vibhor Goyal, San Jose, CA (US); Thomas F Pauly, Campbell, CA (US); Cezar Mihai Radu, Dublin, CA (US); Michael G Voydanoff, Los Gatos, CA (US); Daniel D Schucker, Monte Sereno, CA (US); Howard Tsai, San Jose, CA (US); Giovanni M Agnoli, San Mateo, CA (US); Nagarani Chandika, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 637 days.

(21) Appl. No.: 17/856,716

(22) Filed: Jul. 1, 2022

(65) Prior Publication Data
US 2024/0007956 A1 Jan. 4, 2024

(51) Int. Cl.
H04W 52/02 (2009.01)
H04W 76/38 (2018.01)

(52) U.S. Cl.
CPC ... *H04W 52/0277* (2013.01); *H04W 52/0225* (2013.01); *H04W 52/0264* (2013.01); *H04W 52/028* (2013.01); *H04W 76/38* (2018.02)

(58) Field of Classification Search
CPC ......... H04W 52/0277; H04W 52/0225; H04W 52/0264; H04W 52/028; H04W 76/38;
(Continued)

(56) References Cited

U.S. PATENT DOCUMENTS 6,088,600 A * 7/2000 Rasmussen ........... H04W 76/20
455/574
9,843,959 B2 * 12/2017 Kerner .............. H04W 28/0236
(Continued)

FOREIGN PATENT DOCUMENTS

CN 103959863 7/2014

OTHER PUBLICATIONS

Partial International Search Report for PCT/US2023/026697; Oct. 31, 2023.

*Primary Examiner* — Dominic E Rego
(74) *Attorney, Agent, or Firm* — Kowert, Hood, Munyon, Rankin & Goetzel, P.C.

(57) ABSTRACT

Apparatuses, systems, and methods for application aware cellular radio activation/deactivation, e.g., in 5G NR systems and beyond. The UE may receive, while operating in a power savings mode in which a cellular modem of the UE is disabled, inputs associated with an application of the UE. The UE may determine, based on the inputs, to activate the cellular modem to support the application of the UE. The inputs may include an indication of an application state or status, an indication of an application category, an indication of a state or status of an AI assistant of the UE, an indication of whether an application is a session application, an indication of network assertions, an indication of proximity information, an indication of a WiFi state or a WiFi status, and/or indications associated with one or more timers.

20 Claims, 10 Drawing Sheets

(58) Field of Classification Search
CPC .......... H04W 52/0254; H04W 52/0229; Y02D 30/70
See application file for complete search history.

(56) References Cited

U.S. PATENT DOCUMENTS

| | | | | |
|---|---|---|---|---|
| 9,848,388 | B1* | 12/2017 | Ravipati | H04W 52/028 |
| 11,595,193 | B2* | 2/2023 | Jones | H04L 9/0894 |
| 11,800,442 | B1* | 10/2023 | Bhatnagar | H04W 36/14 |
| 2011/0001744 | A1* | 1/2011 | Chen | G06F 1/3296 |
| | | | | 345/212 |
| 2011/0305232 | A1* | 12/2011 | Singamsetty | H04B 1/7143 |
| | | | | 375/135 |
| 2013/0203463 | A1* | 8/2013 | Kent | H04W 52/0283 |
| | | | | 455/556.1 |
| 2014/0204816 | A1 | 7/2014 | Ismail | |
| 2014/0274225 | A1* | 9/2014 | Lacatus | H04W 52/0241 |
| | | | | 455/574 |
| 2014/0302817 | A1* | 10/2014 | Govindhasamy | H04W 8/245 |
| | | | | 455/411 |
| 2016/0127287 | A1* | 5/2016 | Oh | H04L 51/222 |
| | | | | 715/752 |
| 2016/0357394 | A1* | 12/2016 | Tae | H04W 52/0258 |
| 2019/0200168 | A1* | 6/2019 | Stapleford | H04W 4/029 |
| 2019/0253491 | A1 | 8/2019 | Nonaka | |
| 2020/0057596 | A1* | 2/2020 | Kim | G06F 3/0482 |
| 2020/0112915 | A1* | 4/2020 | Dusenberry | H04W 52/0296 |
| 2020/0267515 | A1* | 8/2020 | Stapleford | H04W 4/14 |
| 2020/0301641 | A1* | 9/2020 | Park | G06F 1/3265 |
| 2020/0325703 | A1* | 10/2020 | Strang | E05B 67/36 |
| 2022/0165146 | A1* | 5/2022 | Daoura | H04W 8/005 |
| 2022/0261059 | A1* | 8/2022 | Bobovych | G06F 1/329 |
| 2023/0010265 | A1* | 1/2023 | Vangaru | H04W 52/0216 |
| 2023/0300748 | A1* | 9/2023 | Das | H04W 52/0235 |
| 2023/0384856 | A1* | 11/2023 | Zhou | G06F 1/3296 |

* cited by examiner

Receive, while operating in a power savings mode in which a cellular modem of the UE is disabled, inputs associated with an application of the UE
1002

Determine, based on the inputs, to activate the cellular modem to support the application of the UE
1004

METHODS AND PROCEDURES FOR EXTENDED BATTERY LIFE

FIELD

The invention relates to wireless communications, and more particularly to apparatuses, systems, and methods for extended battery life of a UE, e.g., such as via enablement of application aware cellular radio activation/deactivation, e.g., in cellular systems, such as LTE systems, 5GNR systems, and beyond.

DESCRIPTION OF THE RELATED ART

Wireless communication systems are rapidly growing in usage. In recent years, wireless devices such as smart phones, wearable devices or accessory devices), and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for extended battery life of a UE, e.g., such as via enablement of application aware cellular radio activation/deactivation, e.g., in 5G NR systems and beyond.

For example, in some embodiments, a UE may receive (e.g., a network connections manager of the UE may receive), while operating in a power savings mode in which a cellular modem of the UE is disabled, an input or inputs associated with an application of the UE. The UE may determine (e.g., a network connections manager of the UE may determine), based on the input or inputs, to activate the cellular modem to support the application of the UE. In some instances, the input or inputs may include any, any combination of, and/or all of (e.g., one or more of and/or at least one of) an indication of an application state or status and/or an application state or status, an indication of an application category and/or an application category, an indication of a state or status of an AI assistant of the UE and/or a state or status of an AI assistant of the UE, an indication of whether an application is a session application, an indication of network assertions and/or network assertions, an indication of proximity information and/or proximity information, an indication of a WiFi state or a WiFi status of the UE and/or a WiFi state or WiFi status of the UE, and/or indications associated with one or more timers (e.g., initiation and/or expiry indications).

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
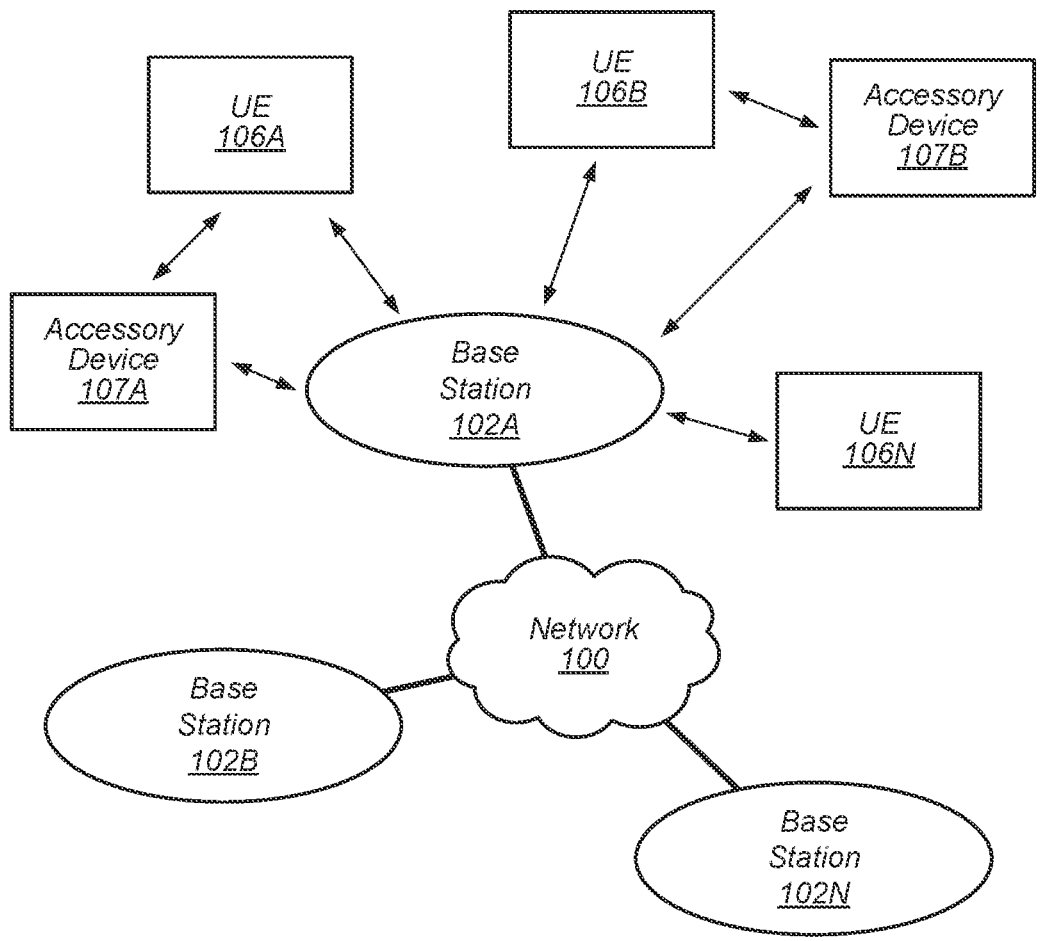
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI: Channel State Information
CSI-RS: Channel State Information Reference Signal
CMR: Channel Measurement Resource
PDCCH: Physical Downlink Control Channel
PDSCH: Physical Downlink Shared Channel
RRC: Radio Resource Control
RRM: Radio Resource Management
CORESET: Control Resource Set
TCI Transmission Configuration Indicator
DCI: Downlink Control Indicator

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
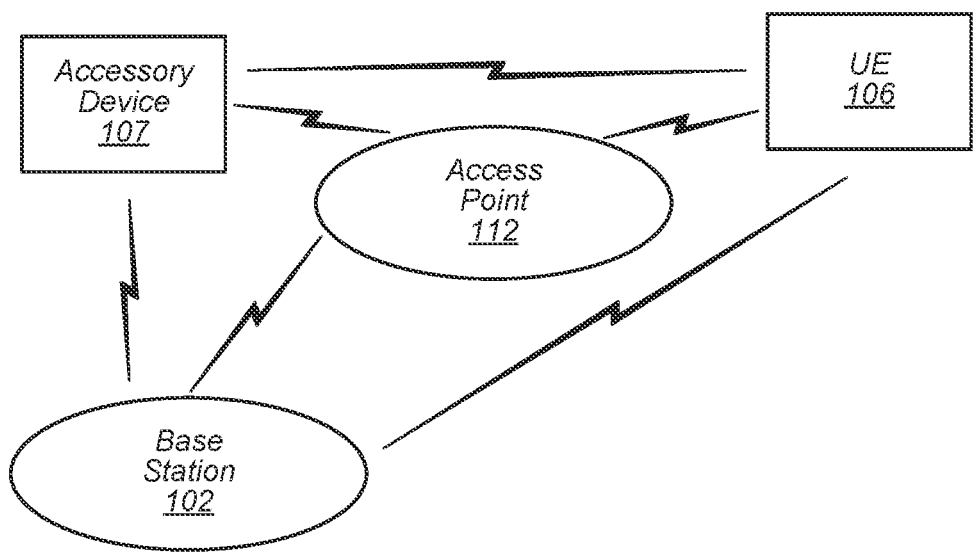
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more wireless devices, such as user devices 106A, 106B, etc., through 106N, as well as accessory devices, such as user devices 107A, 107B. Each of the user devices may be referred to herein as a "user equipment" (UE). Thus, the user devices 106 and 107 are referred to as UEs or UE devices.

The base station (BS) 102A may be a base transceiver station (BTS) or cell site (a "cellular base station") and may include hardware that enables wireless communication with the UEs 106A through 106N as well as UEs 107A and 107B.

The communication area (or coverage area) of the base station may be referred to as a "cell." The base station 102A and the UEs 106/107 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106/107 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106/107 as illustrated in FIG. 1, each UE 106/107 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106/107 may be capable of communicating using multiple wireless communication standards. For example, the UE 106/107 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106/107 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Note that accessory devices 107A/B may include cellular communication capability and hence are able to directly communicate with cellular base station 102A via a cellular RAT. However, since the accessory devices 107A/B are possibly one or more of communication, output power, and/or battery limited, the accessory devices 107A/B may in some instances selectively utilize the UEs 106A/B as a proxy for communication purposes with the base station 102A and hence to the network 100. In other words, the accessory devices 107A/B may selectively use the cellular communication capabilities of its companion device (e.g., UEs 106A/B) to conduct cellular communications. The limitation on communication abilities of the accessory devices 107A/B may be permanent, e.g., due to limitations in output power or the RATs supported, or temporary, e.g., due to conditions such as current battery status, inability to access a network, or poor reception.

FIG. 1B illustrates user equipment 106 (e.g., one of the devices 106A through 106N) and accessory device (or user equipment) 107 (e.g., one of the devices 107A or 107B) in communication with a base station 102 and an access point 112 as well as one another, according to some embodiments. The UEs 106/107 may be devices with both cellular communication capability and non-cellular communication capability (e.g., Bluetooth, Wi-Fi, and so forth) such as a mobile phone, a wearable device, a hand-held device, a computer or a tablet, or virtually any type of wireless device. The accessory device 107 may be a wearable device such as a smart watch. The accessory device 107 may comprise cellular communication capability and be capable of directly communicating with the base station 102 as shown. Note that when the accessory device 107 is configured to directly communicate with the base station, the accessory device may be said to be in "autonomous mode." In addition, the accessory device 107 may also be capable of communicating with another device (e.g., UE 106), referred to as a proxy device, intermediate device, or companion device, using a short-range communications protocol; for example, the accessory device 107 may according to some embodiments be "paired" with the UE 106, which may include establishing a communication channel and/or a trusted communication relationship with the UE 106. Under some circumstances, the accessory device 107 may use the cellular functionality of this proxy device for communicating cellular voice and/or data with the base station 102. In other words, the accessory device 107 may provide voice and/or data packets intended for the base station 102 over the short-range link to the UE 106, and the UE 106 may use its cellular functionality to transmit (or relay) this voice and/or data to the base station on behalf of the accessory device 107. Similarly, the voice and/or data packets transmitted by the base station and intended for the accessory device 107 may be received by the cellular functionality of the UE 106 and then may be relayed over the short-range link to the accessory device. As noted above, the UE 106 may be a mobile phone, a tablet, or any other type of hand-held device, a media player, a computer, a laptop or virtually any type of wireless device. Note that when the accessory device 107 is configured to indirectly communicate with the base station 102 using the cellular functionality of an intermediate or proxy device, the accessory device may be said to be in "relay mode."

The UE 106/107 may include a processor that is configured to execute program instructions stored in memory. The UE 106/107 may perform any of the method embodiments described herein by executing such stored instructions. Alternatively, or in addition, the UE 106/107 may include a programmable hardware element such as an FPGA (field-programmable gate array) that is configured to perform any of the method embodiments described herein, or any portion of any of the method embodiments described herein.

The UE 106/107 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106/107 may share one or more parts of a receive and/or transmit chain between multiple wireless communication technologies, such as those discussed above.

In some embodiments, the UE 106/107 may include separate transmit and/or receive chains (e.g., including separate antennas and other radio components) for each wireless communication protocol with which it is configured to communicate. As a further possibility, the UE 106/107 may include one or more radios which are shared between multiple wireless communication protocols, and one or more radios which are used exclusively by a single wireless communication protocol. For example, the UE 106/107 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
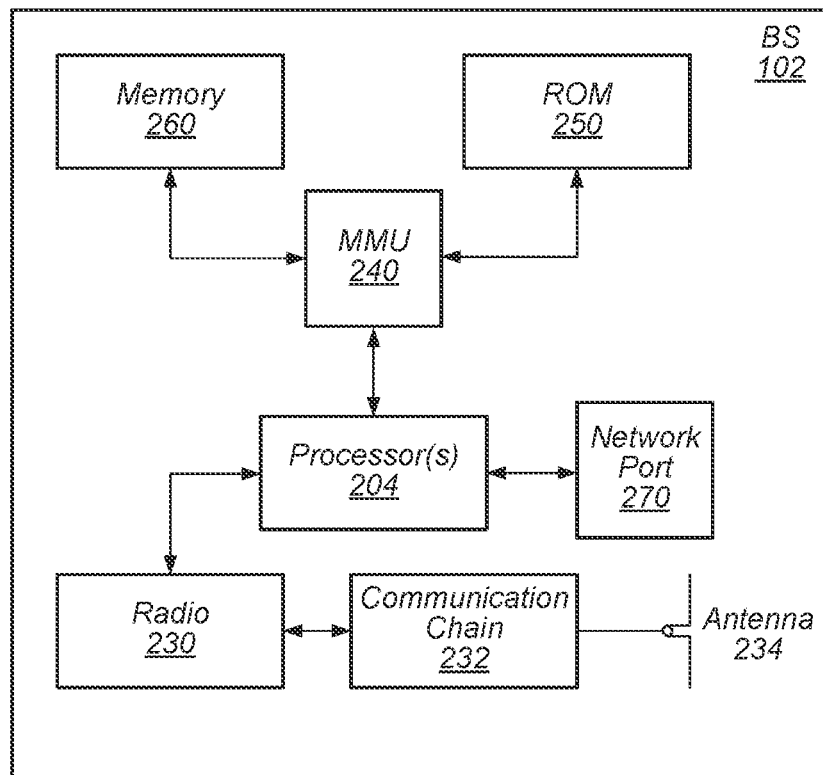
FIG. 2 illustrates an example block diagram of a base station, according to some embodiments.

FIG. 2: Block Diagram of a Base Station

Figure 3:
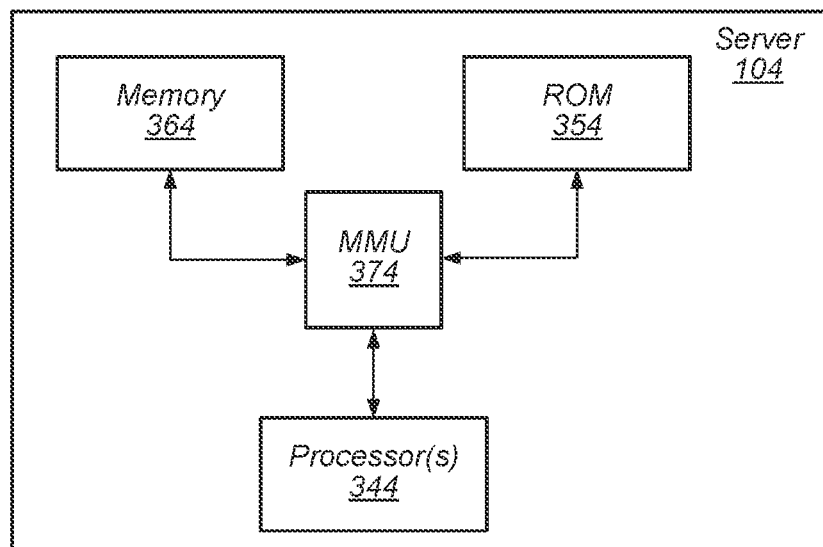
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5GNR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5GNR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server.

As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
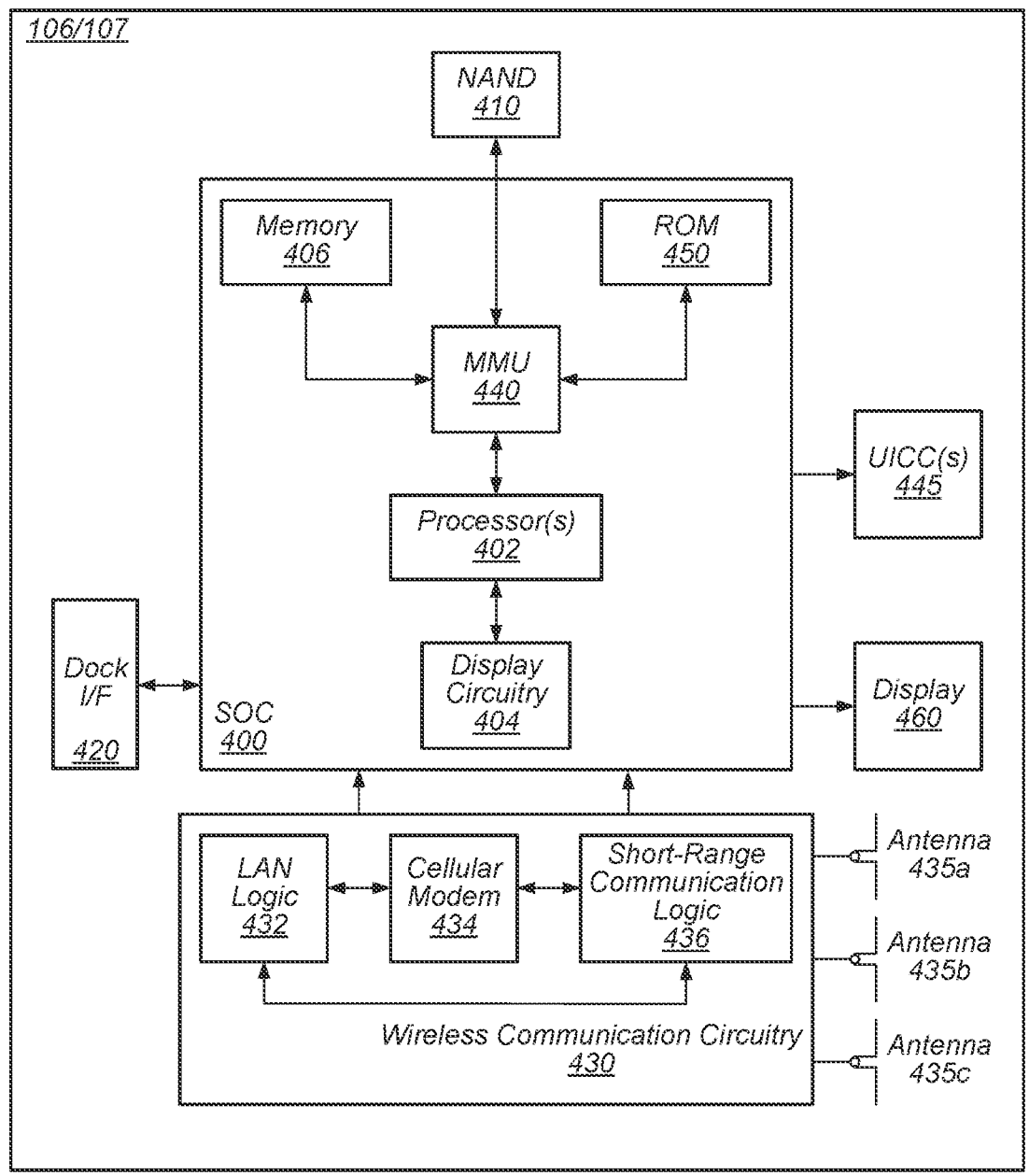
FIG. 4 illustrates an example block diagram of a UE according to some embodiments.

FIG. 4: Block Diagram of a UE

FIG. 4 illustrates an example simplified block diagram of a communication device 106/107, according to some embodiments. It is noted that the block diagram of the communication device of FIG. 4 is only one example of a possible communication device. According to embodiments, communication device 106/107 may be a user equipment (UE) device, a mobile device or mobile station, a wireless device or wireless station, a desktop computer or computing device, a mobile computing device (e.g., a laptop, notebook, or portable computing device), a wearable device, a tablet, an unmanned aerial vehicle (UAV), a UAV controller (UAC) and/or a combination of devices, among other devices. As shown, the communication device 106/107 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106/107 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106/107, and wireless communication circuitry 430. The wireless communication circuitry 430 may include a cellular modem 434 such as for 5G NR, LTE, GSM, etc., and short to medium range wireless communication logic 436 (e.g., Bluetooth™ and WLAN circuitry). In some embodiments, communication device 106/107 may include wired communication circuitry (not shown), such as a network interface card, e.g., for Ethernet.

The wireless communication circuitry 430 may couple (e.g., communicatively; directly or indirectly) to one or more antennas, such as antennas 435a, 435b, and 435c (e.g., 435a-c) as shown. The wireless communication circuitry 430 may include local area network (LAN) logic 432, the cellular modem 434, and/or short-range communication logic 436. The LAN logic 432 may be for enabling the UE device 106/107 to perform LAN communications, such as Wi-Fi communications on an 802.11 network, and/or other WLAN communications. The short-range communication logic 436 may be for enabling the UE device 106/107 to perform communications according to a short-range RAT, such as Bluetooth or UWB communications. In some scenarios, the cellular modem 434 may be a lower power cellular modem capable of performing cellular communication according to one or more cellular communication technologies.

In some embodiments, as further described below, cellular modem 434 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular modem 434 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106/107 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106/107 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106/107 may include at least two SIMs. Each SIM may execute one or more SIM applications and/or otherwise implement SIM functionality. Thus, each SIM may be a single smart card that may be embedded, e.g., may be soldered onto a circuit board in the UE 106/107, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106/107 may include a combination of removable smart cards and fixed/non-removable smart cards (such as one or more eUICC cards that implement eSIM functionality), as desired. For example, the UE 106/107 may comprise two embedded SIMs, two removable SIMs, or a combination of one embedded SIMs and one removable SIMs. Various other SIM configurations are also contemplated.

As noted above, in some embodiments, the UE 106/107 may include two or more SIMs. The inclusion of two or more SIMs in the UE 106/107 may allow the UE 106/107 to support two different telephone numbers and may allow the UE 106/107 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106/107 comprises two SIMs, the UE 106/107 may support Dual SIM Dual Active (DSDA) functionality. The DSDA functionality may allow the UE 106/107 to be simultaneously connected to two networks (and use two different RATs) at the same time, or to simultaneously maintain two connections supported by two different SIMs using the same or different RATs on the same or different networks. The DSDA functionality may also allow the UE 106/107 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106/107 may support Dual SIM Dual Standby (DSDS) functionality. The DSDS functionality may allow either of the two SIMs in the UE 106/107 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for extended battery life of a UE, e.g., such as via enablement of application aware cellular radio activation/deactivation, e.g., in 5GNR systems and beyond, as further described herein.

As described herein, the communication device 106/107 may include hardware and software components for implementing the above features for a communication device 106/107 to communicate a scheduling profile for power savings to a network. The processor 402 of the communication device 106/107 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
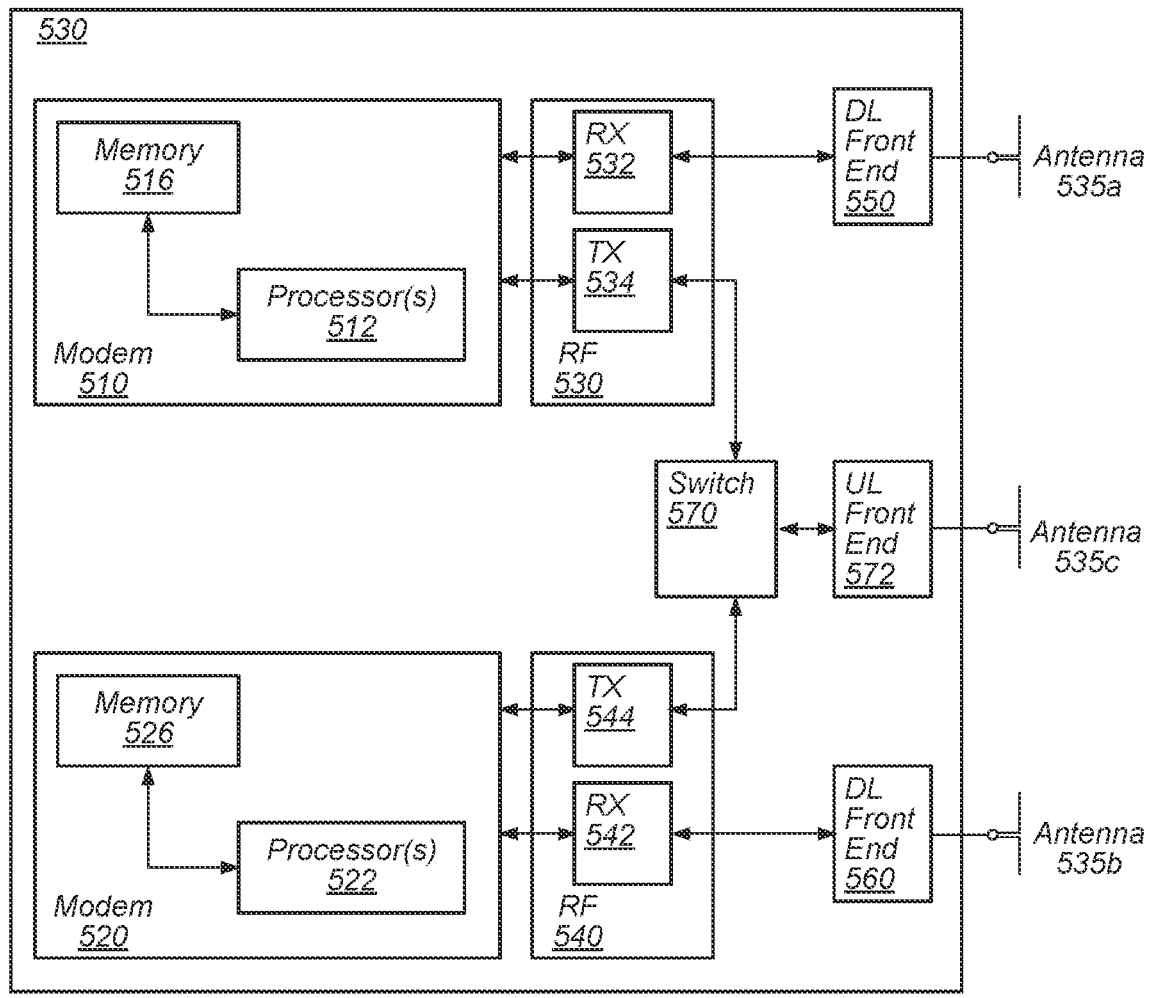
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular modem circuitry 434, may be included in a communication device, such as communication device 106/107 described above. As noted above, communication device 106/107 may be a user equipment (UE) device, a mobile device or mobile station, a wireless device or wireless station, a desktop computer or computing device, a mobile computing device (e.g., a laptop, notebook, or portable computing device), a tablet, a wearable device, and/or a combination of devices, among other devices.

The cellular communication circuitry 530 may couple (e.g., communicatively; directly or indirectly) to one or more antennas, such as antennas 535a-c (which may be antennas 435a-c of FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 535a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 535b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 535c. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for extended battery life of a UE, e.g., such as via enablement of application aware cellular radio activation/deactivation, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 535a-c may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for extended battery life of a UE, e.g., such as via enablement of application aware cellular radio activation/deactivation, e.g., in 5G NR systems and beyond, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 535a-c may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
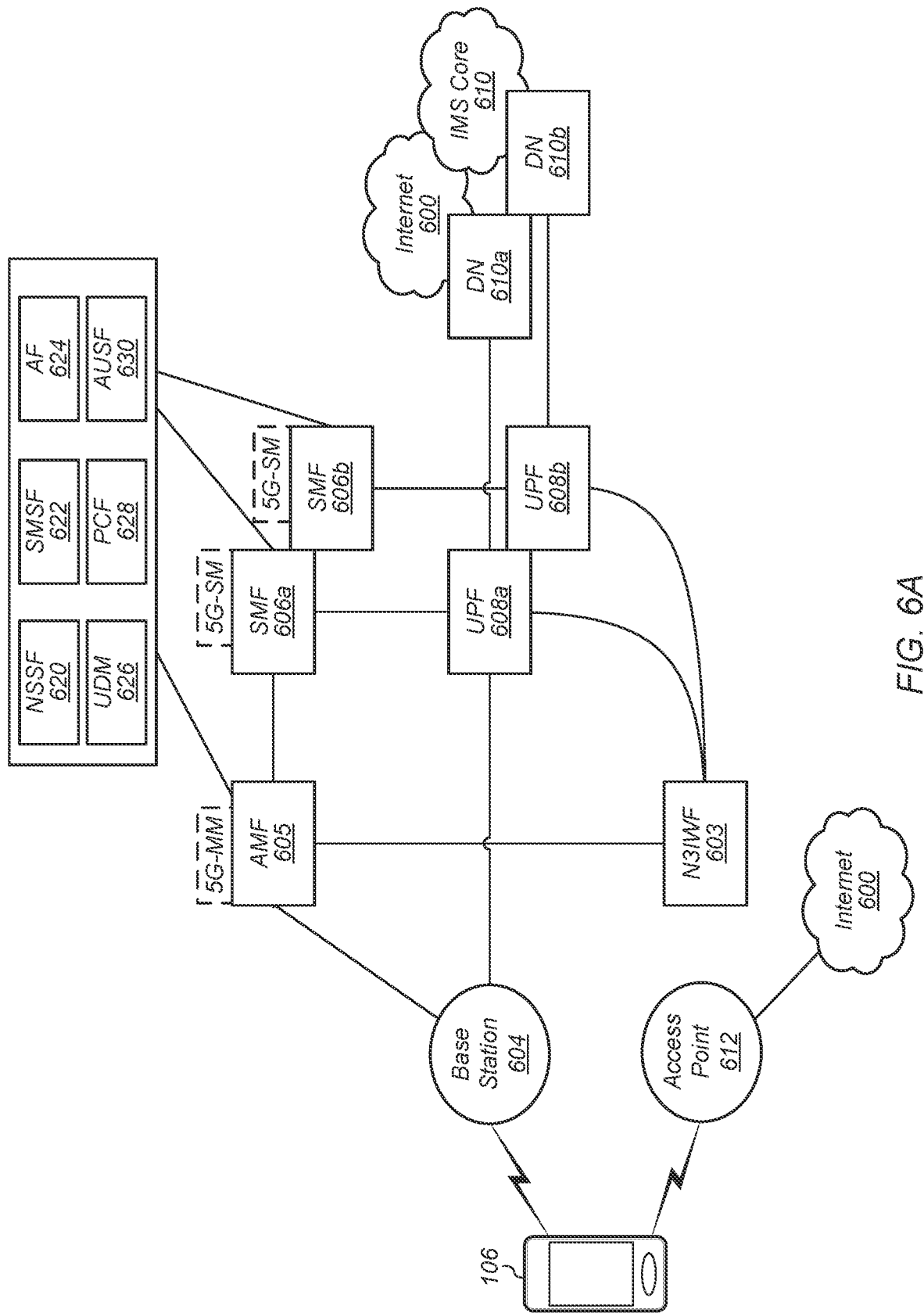
FIG. 6A illustrates an example of a 5G network architecture that incorporates both 3GPP (e.g., cellular) and non-3GPP (e.g., non-cellular) access to the 5G CN, according to some embodiments.
Figure 6B:
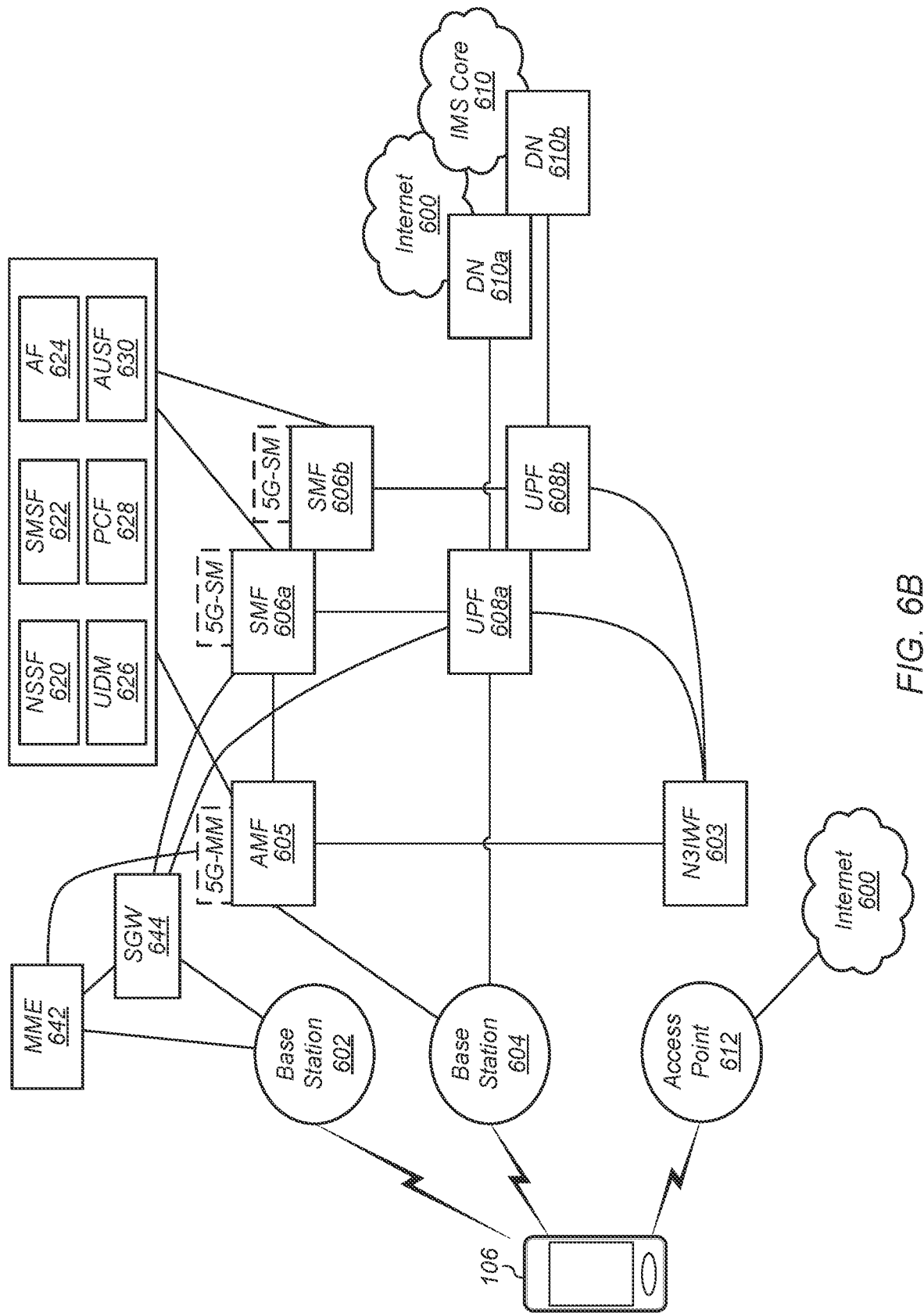
FIG. 6B illustrates an example of a 5G network architecture that incorporates both dual 3GPP (e.g., LTE and 5G NR) access and non-3GPP access to the 5G CN, according to some embodiments.
Figure 7:
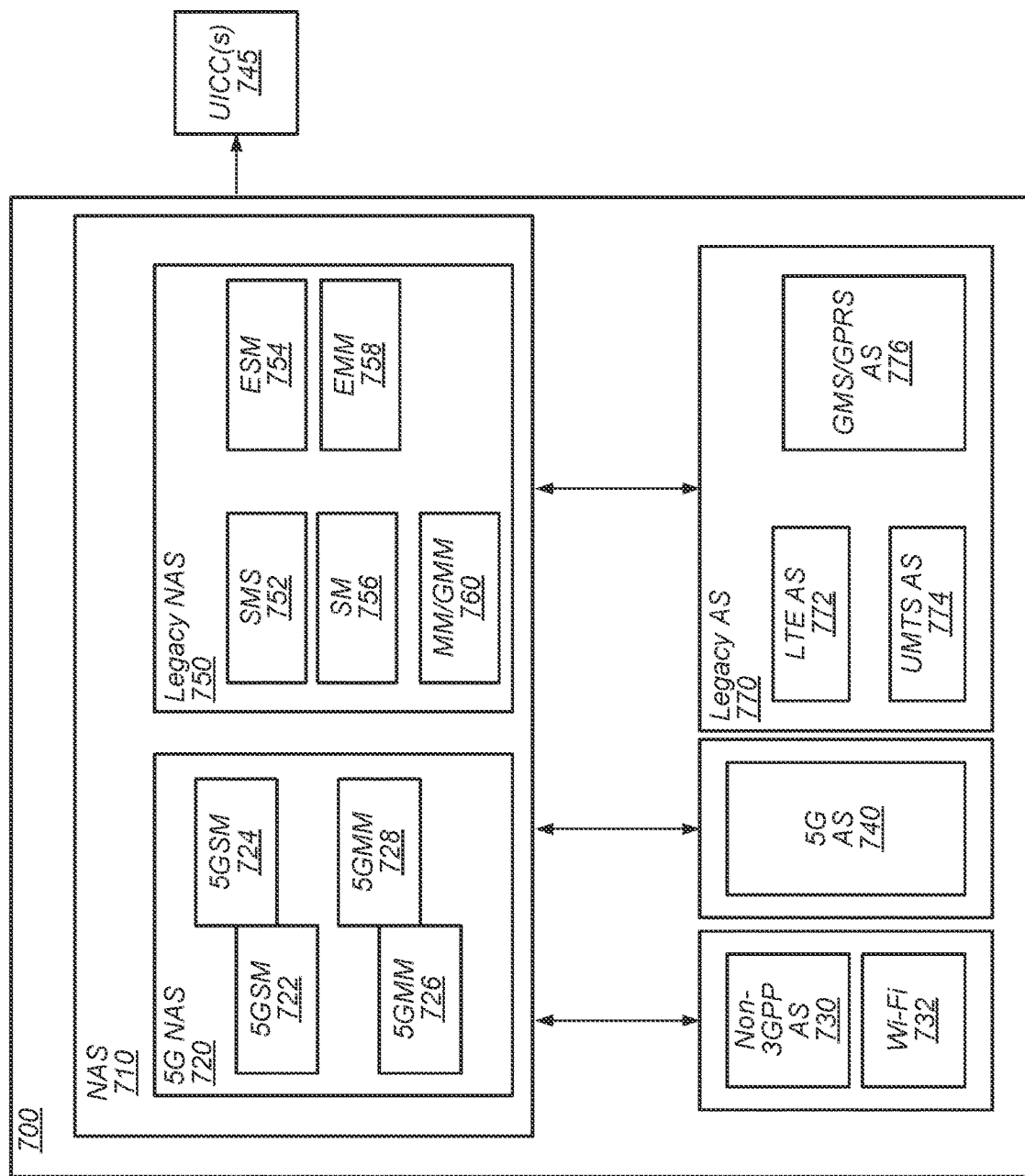
FIG. 7 illustrates an example of a baseband processor architecture for a UE, according to some embodiments.

FIGS. 6A, 6B and 7: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106/107. In addition, the RAN (e.g., gNB 604) may also have a connection to the AMF 605. Thus, the 5G CN may support unified authentication over both connections as well as allow simultaneous registration for UE 106/107 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 605 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods for extended battery life of a UE, e.g., such as via enablement of application aware cellular radio activation/deactivation, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for extended battery life of a UE, e.g., such as via enablement of application aware cellular radio activation/deactivation, e.g., in 5G NR systems and beyond, e.g., as further described herein.

Extended Battery Life of a UE

As noted above, certain UEs may be wearable devices, e.g., such as eyeglasses, watches, fitness trackers, and so forth. Such devices are typically smaller in form factor as compared to more traditional UEs, e.g., such as tablets or phones. Due to the smaller form factor, in many instances such devices may have limited battery, CPU, and/or memory resources.

Further, it has become evident that one of the primary reasons consumers purchase wearable devices with cellular modems (e.g., such as cellular capable watches or eyeglasses) is that the consumer can wear these devices without the need to carry around a companion device, e.g., such as a phone or tablet. This may be especially the case when a consumer goes on a so-called adventure weekend such as an extended or multi-day hike. In such instances, the consumer may want the wearable device to provide necessary on-demand functionality (e.g., cellular capabilities for online applications) without consuming too much power, e.g., such that the wearable device can remain powered on for multiple days without recharging.

However, due to size constraints, a battery that supports a wearable device may have a limited size and as such, a much more limited amount of power as compared to a traditional UE. This is especially the case for power hungry components, such as a cellular modem/radio. Thus, improvements are desired.

Embodiments described herein provided systems, methods, and mechanisms for extended battery life of a UE, e.g., such as via enablement of application aware cellular radio activation/deactivation. For example, in some embodiments, to provide extended/enhanced battery life, a power-efficient on-demand cellular connectivity mode (e.g., an extended mode) may be implemented. In the on-demand cellular connectivity mode, a cellular modem/radio may remain powered off in most instances unless a user is attempting to use the cellular modem (or cellular radio, e.g., baseband processor). As an example, the cellular modem/radio may remain powered off (inactive) unless and/or until an application is launched (activated) and requests cellular connectivity while in a foreground application state. In addition, the device may determine (or infer) that an application may require cellular connectivity based, at least in part, on a user initiating sharing of content (e.g., pictures, images, videos, and so forth), e.g., via a sharing UI and/or based, at least in part, on an application in a foreground state initiating a network connection. For example, a user may initiate (launch) a sharing UE while using a photos application, e.g., to share content (photos) via email or other messaging. Additionally, the cellular modem may only remain active so long as the application that requested cellular connectivity remains in the foreground application state (e.g., foreground mode) and a screen (display) of the device remains active (e.g., not in a locked mode of operation). As another example, when an artificial intelligence (e.g., such as Amazon Alexa, Google Assistant, Hound, Robin, Extreme, Jarvis, DataBot, and/or Apple SIRI) of the device is activated by a user and the artificial intelligence requests cellular connectivity, the cellular modem may be activated. As a further example, when certain preferred applications such as an application to make phone calls and/or a messaging application are launched by a user and the device has no other means (e.g., companion device and/or WiFi) to provide network connectivity, the cellular modem may be activated. Note that in at least some instances, the device may selectively activate the cellular modem when a call is initiated via WiFi or a companion device to allow a subsequent handover to cellular when necessary. Further, when certain applications, such as session applications, e.g., applications that have a longer than typical session duration (navigation applications, workout applications, music applications, streaming applications, and so forth) and may run while in a background application state, are launched, the cellular modem may be activated when such applications attempt to access online content. Note that the duration of such cellular modem activation may be limited during session applications, e.g., to five minutes or less. In addition, one or more timers may be used to activate the cellular modem to receive incoming notifications, e.g., periodically, such as every 60 minutes, 90 minutes, and/or 120 minutes (e.g., dependent on a current battery level, a timer may be extended (lengthening duration until next cellular modem activation) and/or reduced (shortening duration until a next cellular modem activation). The notifications may be missed voice calls, voicemails, emails, text messages, other types of messages, and/or any other type of push notification. In some instances, event-based activation of the cellular modem (e.g., via application launch) may reset such a timer.

Figure 8C:
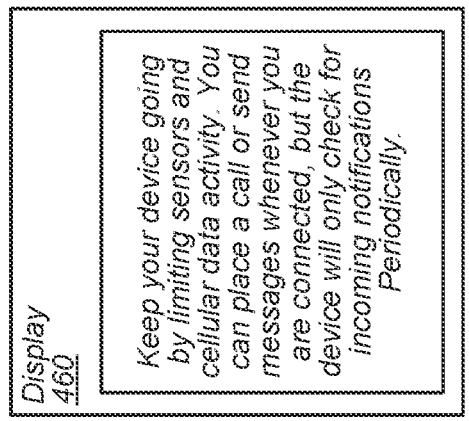
FIGS. 8A-8C illustrate examples of UIs for activating an extended mode of a UE, according to some embodiments.
Figure 8B:
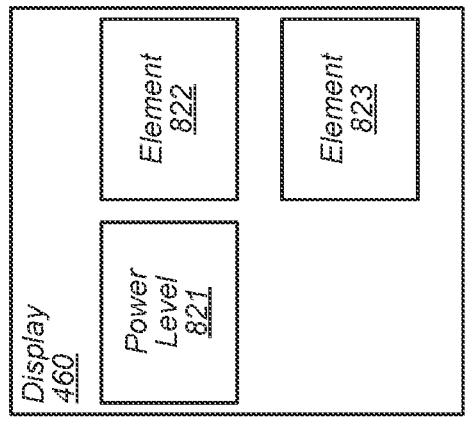
Figure 8A:
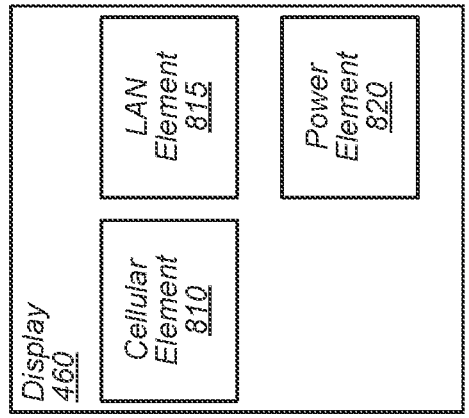

In some instances, an extended mode of a UE may be enabled via user interaction with a user interface (UI). For example, as illustrated by FIGS. 8A-C, a display of a UE, such as display 460 of UE 106/107, may include a first user interface (UI) that displays various elements associated with power that may be enabled and/or disabled, e.g., such as a cellular element 810 for enabling/disabling a cellular modem, a LAN element 815 or enabling/disabling LAN logic and/or a LAN radio (e.g., such as a Wi-Fi radio), as well as a power element 820 for displaying a battery power level of the UE as well as for enabling/disabling an extended power and/or low power mode of the UE. In some instances, as shown in FIG. 820, selection of the power element 820 may display a second UI that includes a current battery power level 821, an element 822 for enabling/disabling the extended/low power mode of the UE, and an element 823 to power off the UE. In some instances, enablement of the extended/low power mode may display a third UI, e.g., as illustrated in FIG. 8C. As shown, the third UI may display a disclosure to the user informing the user of the functionality of the extended/low power mode. In some instances, once a user enables the extended/low power mode of the UE, the UE may remain in the extended/low power mode until the user disables the extended/low power mode or until a battery level of the UE is charged to above a first threshold level, e.g., such as 80%. Note that the UE may (automatically) disable the extended/low power mode when a battery level is increased above a first threshold level, e.g., the first threshold may only be activated when a battery of the UE is being charged or re-charged. Note further that the UE may enable (e.g., automatically or via a UI prompt to a user) the extended/low power mode when a battery level of the UE drops below a second threshold level, e.g., such as 20%. In addition, when a user determines to not enter the extended/low power mode upon the battery level moving below the second threshold level, the UE may continue to prompt the user to enable the extended/low power mode at pre-defined intervals of battery level usage, e.g., every 5% of battery usage. Thus, for example, if the second threshold level was defined as 25%, the user may be prompted by the UE at 20% remaining battery level, 15% remaining battery level, and so forth until the user enables the extended/low power mode or until the remaining battery level drops below 5%.

Figure 9:
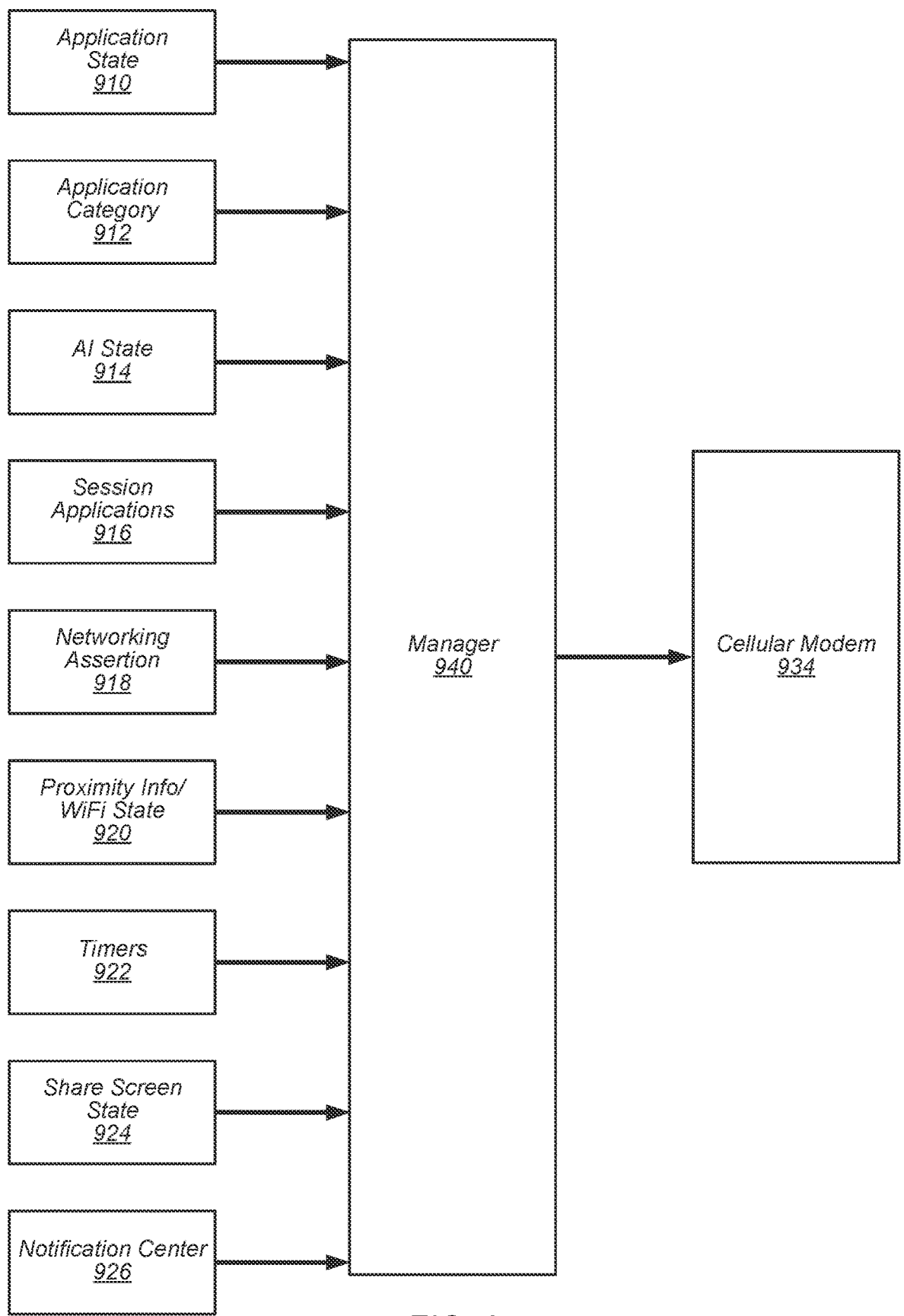
FIG. 9 illustrates an example of a manager of network connections of a UE, according to some embodiments.

In some instances, a module within the UE may manage enablement/disablement (activation/deactivation) of the cellular modem, e.g., at least while in the extended/low power mode of operation. For example, FIG. 9 illustrates an example of such a module, according to some embodiments. As shown, manager 940, which may be a RAT manager, at least in some instances, may receive inputs from various applications and/or modules/systems of a UE, such as UE 106/107. Thus, manager 940 may receive inputs such as application state 910, application category 912, AI state 914, session applications 916, networking assertion 918, proximity information/WiFi state 920, timers 922, share screen state 924, and/or notifications center 926. Further, based on these inputs, manager 940 may determine when and/or whether to activate and/or disable (deactivate) cellular modem 934, which may be a cellular modem 434. Note that manager 940 may control other communication logic/circuitry in addition to the cellular modem 934. For example, manager 940 may control activation and/or deactivation of any and/or all elements of wireless communication circuitry 430, e.g., such as LAN logic 432, cellular modem 434, and/or short-range communication logic 436. Thus, manager 940 may control when and/or how (e.g., via which RAT and/or access medium) a UE communicates.

The application state 910 input may indicate a current state of an application. For example, whether the application is in a foreground state (e.g., actively being displayed via a display of the UE), in a background state (e.g., running/executing but not actively being displayed via the display of the UE), in a closed state (e.g., not running or executing), or in a launch state (e.g., initiating execution). In some instances, the application state of an application may impact a determination by manager 940 on whether to activate and/or deactivate cellular modem 934. Additionally, a change in application state (e.g., from a closed state to a foreground state or switches between the foreground state and background state) may impact a determination by manager 940 on whether to activate and/or deactivate cellular modem 934 as well as timers associated with extended/low power mode operations.

The application state 910 may indicate a current state of an application. For example, whether the application is in a foreground state (e.g., actively being displayed via a display of the UE), in a background state (e.g., running/executing but not actively being displayed via the display of the UE), in a closed state (e.g., not running or executing), or in a launch state (e.g., initiating execution). In some instances, the application state of an application may impact a determination by manager 940 on whether to activate and/or deactivate cellular modem 934. Additionally, a change in application state (e.g., from a closed state to a foreground state or switches between the foreground state and background state) may impact a determination by manager 940 on whether to activate and/or deactivate cellular modem 934 as well as timers associated with extended/low power mode operations.

In some instances, the manager 940 may indicate cellular connectivity is online (e.g., possible) to active and/or launching applications even when the cellular modem is deactivated. In this manner, an application can then initiate a networking connection when needed even though the cellular modem is deactivated. Thus, upon detection of a networking connection request, the manager 940 may activate the cellular modem to provide network connectivity to the application. Otherwise, if the application would be aware that the cellular modem is deactivated, the application may not attempt a networking connection. Hence, in some instances, the manager 940 may enable networking policies to ensure specific application behaviors, e.g., such as applications perceive a cellular connection is available even when a cellular modem is switched off (deactivated), networking daemons that perform cellular networking in background perceive cellular is not available so they do not attempt network connection, and/or policy refresh each time an application is installed and/or uninstalled from the UE to ensure correct policy is active.

In some instances, to support voice calling, the manager 940 may support all outgoing calls while opportunistically supporting incoming calls (e.g., when an incoming call is received while the cellular modem is activated and/or while on WiFi, the manager 940 will accept the call). In some instances, an incoming call may be supported when a UE is Internet protocol (IP) multimedia subsystem (IMS) registered over cellular or WiFi. In some instances, the manager 940 may support IMS call handover from WiFi to cellular and/or from cellular to WiFi. As an example, when a user launches a phone application, the manager 940, e.g., as further described below, may activate the cellular modem and register with the network. As another example, when a user dials a phone number or initiates a call from a contact UI, the manager 940 may place the call when the cellular modem is already registered and/or wait for registration to attempt the call. In some instances, a call may continue over cellular even when a display is deactivated or when the UE transitions to a proximity mode.

In some instances, when a UE is in proximity mode and/or connected via WiFi, when a phone application is launched, the manager 940 may activate the cellular modem (e.g., transition to CMAS) and may immediately place a call when attempted by the user over WiFi or via a companion UE (e.g., when in proximity mode). The call may then continue over WiFi even when the display is deactivated and/or when the UE transitions to proximity mode. In such instances, if WiFi coverage is lost (e.g., UE moves out of WiFi coverage area), the call may be handed over to cellular.

In some instances, to avoid (or prevent) a first call drop upon cellular activation, the manager 940 may determine whether the UE is IMS or CS registered with cellular prior to initiating the call. Once the manager 940 determines that the UE is IMS or circuit switched (CS) registered, the call may be placed, otherwise, the manager 940 may wait a pre-determined time duration (e.g., to allow IMS or CS registration) prior to attempting the call. The pre-determined time duration may be approximately 10 seconds or 20 seconds, e.g., a short delay that will be user acceptable (e.g., not negatively impact user experience) as compared to a call drop on a first call attempt.

The application category 912 input may indicate a category of an application, e.g., whether the application is a preferred application or a non-preferred application. The application category may be indicated by an application policy list entry in a database stored on a third-party server and accessible to (and/or by) the UE, e.g., either directly and/or via a companion device. Further, based on the application category, the manager 940 may implement or use certain policies associated with activation/deactivation of the cellular modem. For example, when an application is a preferred application (e.g., an entry in the application policy list indicates that application is preferred, for example, via a WKPrefersNetworkUponForeground category/parameter), the manager 940 may activate the cellular modem upon (at) launch of the application, e.g., the manager 940 may not wait for the application to attempt a networking connection prior to activating the cellular modem. Examples of preferred applications may include a phone application (e.g., to initiate and/or receive a call), an application store, and/or a messaging application. As another example, when an application is a non-preferred application, the manager 940 may activate the cellular modem when the application is in a foreground application state and attempts to initiate a networking connection, e.g., when the application makes an explicit networking request while in the foreground application state and/or when the application launches (initiates) a share screen to share content (e.g., such as photos, videos, and/or other data files) via email or other messaging. Examples of non-preferred applications include stock trading/tracking applications, banking applications, various gaming applications, photos, and so forth. Note that for all applications, once the cellular modem has been activated, the manager 940 may keep the cellular modem online (e.g., powered) at least while the application is in the foreground. Note further, that when an application state of an application switches from foreground to background or inactive while the cellular modem is online, the manager 940 may leave the cellular modem online for at least a first time duration, e.g., such as 60 seconds or 120 seconds or 240 seconds, and the like, e.g., to avoid rapid deactivation and reactivation of the cellular modem which can be more power consuming than leaving the cellular modem online for the first time duration. Upon expiration of the first time duration, the manager 940 may then deactivate the cellular modem, e.g., if there are no active network connections and/or requests.

In some instances, when a non-preferred application is active, the manager 940 may monitor network assertions from a networking layer of the UE and check (determine) whether there is an active connection request from an application currently in a foreground application state. Further, the manager 940 may determine whether a connection attempt has originated from the application in the foreground application state by matching an application bundle identifier (ID), a universally unique identifier (UUID), and/or a process ID (PID) with a network connection bundle ID, UUID, and/or PID (e.g., when an application identifier matches with a network connection identifier, the manager 940 may activate the cellular modem). Alternatively, and/or in addition, the manager 940 may activate the cellular modem for the application in the foreground application state when cellular has not been disabled by a user via a user settings UI of the UE.

The AI state 914 input may indicate a state of an AI module of the UE, e.g., whether the AI module of the UE is active or inactive. In some instances, when the AI module of the UE is in an active state, the manager 940 may activate the cellular modem when the AI module requests a network connection.

The session applications 916 input may indicate whether an application is a session application, e.g., such as a music, navigation, streaming, and/or workout application. Note that session applications may be defined as long running applications that can continue to run even when a display of the UE is not active and/or when the applications are not in a foreground application state. In some instances, another module, such as a carousel module, may provide resources necessary to ensure that session applications are able to run even when not in the foreground application state. In some instances, when a session application is active, the manager 940 may monitor network assertions from a networking layer of the UE. Based on the monitoring, the manager 940 may check (e.g., determine) whether there is an active connection request from the session application. For example, the manager 940 may determine whether a connection attempt has originated from the application in the foreground application state by matching an application bundle identifier (ID), a universally unique identifier (UUID), and/or a process ID (PID) with a network connection bundle ID, UUID, and/or PID (e.g., when an application identifier matches with a network connection identifier, the manager 940 may activate the cellular modem). Alternatively, and/or in addition, the manager 940 may activate the cellular modem for the application in the foreground application state when cellular has not been disabled by a user via a user settings UI of the UE. Further, the UE may support multiple simultaneous active session applications at a given time, e.g., music and navigation applications running concurrently and/or music and workout applications running concurrently and/or workout and navigation applications running concurrently, and so forth. In such instances, the manager 940 may monitor networking attempts from active session applications and activate the cellular modem when there is a networking connection attempt from at least one of the session applications.

The networking assertion 918 input may indicate when an application attempts a network connection. For example, the manager 940 may receive a networking assertion input when an application in a foreground state or a background state initiates a network connection. In some instances, e.g., as described above, the manager 940, upon receiving the networking assertion input, may determine whether the network connection attempt was initiated by an application in a foreground state. Thus, the manager 940 may attempt to match an application bundle identifier (ID), a universally unique identifier (UUID), and/or a process ID (PID) with a network connection bundle ID, UUID, and/or PID (e.g., when an application identifier matches with a network connection identifier, the manager 940 may activate the cellular modem).

The proximity information/WiFi state 920 input may indicate whether the UE is within proximity of a companion UE (e.g., another UE connected to the UE via a local connection and capable of supporting a cellular connection for the UE) and/or whether the UE is connected to and/or within range of a WiFi network. In some instances, the manager 940 may use the proximity information/WiFi state to determine whether to initiate a call over WiFi, via a companion device, or by activating the cellular modem.

The timers 922 input may indicate a status of one or more timers associated with activation and/or deactivation of a cellular modem of the UE. For example, a debounce timer may be initiated when an application with an active cellular network connection is deactivated (e.g., closed and/or exited). The debounce timer may have a duration of 60 seconds to 120 seconds among other durations and may aid in the manager 940 avoiding repeated activation/deactivation of the cellular modem. As described above, the manager 940 may not immediately deactivate the cellular modem when an application with an active cellular network connection is deactivated and may instead wait for a notification (e.g., via timers input 922) of expiration of the debounce timer prior to deactivating the cellular modem. Note that the debounce timer may be reset (e.g., the manager 940 may not be notified of expiration of the debounce timer) when another application in a foreground state initiates a network connection prior to expiration of the debounce timer. In other words, the debounce timer, once initiated, may not expire while an application in a foreground state is initiating a network connection. For example, if a first application using a cellular network connection is deactivated thereby initiating the debounce timer and a second application is activated and initiates a cellular network connection prior to expiration of the debounce timer, the debounce timer may be reset and the manager 940 may not be notified of expiration of the debounce timer.

The share screen state 924 input may indicate a status of a share screen, e.g., whether a user or application has launched a share screen with an intent to share content over a network connection (e.g., such as via an email or other message). Thus, when the manager 940 receives an input from share screen state 924 that indicates that the share screen is active, the manager may activate the cellular modem.

The notification center 926 input may indicate a status of a notifications UI/screen of the UE to the manger 940, e.g., whether the notifications UI/screen is active. Thus, when manager 940 receives an input from the notifications center 926 indicating that the notifications UI/screen is active, the manager 940 may activate the cellular modem to download notifications (e.g., such as voicemails, missed calls, messages, emails, and/or other push notifications that may be pending for the UE).

In some instances, a breadcrumb timer/wakeup timer/ periodic timer may periodically notify the manager 940 to activate the cellular modem, e.g., every 60 minutes or 120 minutes, among other time durations. Thus, the manager 940 may activate the cellular modem periodically, e.g., upon notification of expiration of breadcrumb timer/wakeup timer/periodic timer to check for and/or receive incoming notifications—e.g., such as messages, emails, various push notifications, and the like, as well as to complete background networking activities.

In some instances, a timer may be initiated when the cellular modem has been deactivated and, upon expiry, may notify the manager 940 to activate the cellular modem to check for and/or receive incoming notifications—e.g., such as messages, emails, various push notifications, and the like, as well as to complete background networking activities. Note that such a timer may be reset/re-initiated upon activation of the cellular modem. Further, in such instances, the manager 940 may opportunistically complete such tasks (e.g., receiving notifications) when the cellular modem is active. For example, the manager 940 may monitor a time period between activations of the cellular modem and when the time period exceeds a threshold (e.g., 20 minutes, 30 minutes, 40 minutes, and so forth), the manager 940 may opportunistically check for various notifications and/or complete various background network activities. In other words, as the duration of time between cellular activations increases, the manger 940 may perform more networking tasks upon the next activation thereby avoiding unnecessary activations of the cellular modem to complete such tasks. Thus, the manager 940 may only be notified of expiration of the timer when the cellular modem has been deactivated for a period of time, e.g., such as 60 minutes or 120 minutes, among other time durations. Note that such a time may be in addition to and/or an alternative to the breadcrumb timer/wakeup timer/periodic timer described above.

Figure 10:
FIG. 10 illustrates a block diagram of an example of a method for application aware cellular radio activation, according to some embodiments.

FIG. 10 illustrates a block diagram of an example of a method for application aware cellular radio activation, according to some embodiments. The method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, a UE, such as UE 106 or UE 107 (e.g., a network connections manager of the UE, such as manager 940), may receive, while operating in a power savings mode in which a cellular modem of the UE is disabled, an input or inputs (e.g., at least one input, one or more inputs, and/or a plurality of inputs) associated with an application of the UE.

At 1004, the UE (e.g., a network connections manager of the UE, such as manager 940) may determine, based on the input or inputs, to activate the cellular modem to support the application of the UE. In some instances, the input or inputs may include any, any combination of, and/or all of (e.g., one or more of and/or at least one of) an indication of an application state or status and/or an application state or status, an indication of an application category and/or an application category, an indication of a state or status of an AI assistant of the UE and/or a state or status of an AI assistant of the UE, an indication of whether an application is a session application, an indication of network assertions and/or network assertions, an indication of proximity information and/or proximity information, an indication of a WiFi state or a WiFi status of the UE and/or a WiFi state or WiFi status of the UE, and/or indications associated with one or more timers (e.g., initiation and/or expiry indications).

For example, the input or inputs may include at least an application state or indication of an application state of the application of the UE. The application state may be one of a foreground state or a background state. In some instances, when the application state is the foreground state and the input or inputs further includes a network assertion input, the UE may, to determine, based on the input or inputs, to activate the cellular modem to support the application of the UE, activate the cellular modem based on determining that a connection attempt originated from the application while in the foreground state. In some instances, the UE may compare one of an application bundle identifier (ID), a universally unique identifier (UUID), or a process ID (PID) with one of a network connection bundle ID, UUID, or PID associated with the connection attempt and determine, based on the comparison, that the connection attempt originated form the application. In some instances, when the application state is the foreground state and the input or inputs further includes an indication that a sharing UI/screen has been initiated, the UE may, to determine based on the input or inputs, to activate the cellular modem to support the application of the UE, activate the cellular modem based on determining that the sharing UI/screen has been initiated, e.g., that a user may intend to share content via a network connection, such as via an email or other message.

As another example, the input or inputs may include an application category or indication of an application category of an application. The application category may include one or more of a preferred application or a non-preferred application. In some instances, the UE may determine whether the application is a preferred application or a non-preferred application based on an application policy list. In some instances, the UE may, to determine, based on the input or inputs, to activate the cellular modem to support the application of the UE, determine that the application is a preferred application and activate, upon initiation of the application, the cellular modem. In some instances, the UE may, to determine, based on the input or inputs, to activate the cellular modem to support the application of the UE, determine that the application is a non-preferred application and activate, in response to determining that the application is attempting a network connection while in a foreground application state, the cellular modem. In some instances, the UE may compare one of an application bundle identifier (ID), a universally unique identifier (UUID), or a process ID (PID) with one of a network connection bundle ID, UUID, or PID associated with the connection attempt and determine, based on the comparison, that the connection attempt originated form the application.

As a further example, the input or inputs may include at least a state of or indication of a state of an artificial intelligence (AI) assistant of the UE. The state may be one of active or inactive. In some instances, the UE may, to determine, based on the input or inputs, to activate the cellular modem to support the application of the UE, determine that the state of the AI assistant is active and receive, from the AI assistant, a network connection request.

As a yet further example, the input or inputs may include at least an indication of whether an application is a session application. In some instances, the UE may determine that the application is a session application based on the indication. Further, the UE may monitor, while the session application is active, network assertions from a networking layer of the UE, and determine, based on the monitoring, that there is network connection request from the session application. In some instances, the UE may, in response to the monitoring, compare one of an application bundle identifier (ID), a universally unique identifier (UUID), or a process ID (PID) with one of a network connection bundle ID, UUID, or PID associated with the connection attempt and determine, based on the comparison, that the connection attempt originated from the session application.

As an additional example, the input or inputs may include at least an indication of proximity information and/or WiFi state or status of the UE. In some instances, the UE may, to determine, based on the input or inputs, to activate the cellular modem to support the application of the UE, determine, based on the indication, that the UE is not in a proximity mode or that the UE is not connected to a local area network via WiFi and activate, based on the determining, the cellular modem, upon detection of a network connection request.

As a yet additional example, the input or inputs may include at least one or more timers. In some instances, a timer of the one or more timers may be a periodic timer. In such instances, the UE may monitor the periodic timer and upon expiry of the periodic timer, activate the cellular modem. In some instances, a first timer of the one or more timers may be a wakeup timer. In such instances, the UE may initiate, upon deactivation of the cellular modem, the wakeup timer and monitor for activation of the cellular modem. Further the UE may, upon detection of activation of the cellular modem, restart the wakeup time. In addition, the UE may, upon expiration of the wakeup timer, activate the cellular modem.

In addition, as an example, the input or inputs may include an indication that a notifications center UI/screen/application is active. In such instances, the UE may, to determine, based on the input or inputs, to activate the cellular modem to support the application of the UE, determine that a user may intend to view pending notifications (e.g., email, missed calls, messages, voicemails, and/or other push notifications) and activate the cellular modem to allow download of the pending notifications.

In some instances, the UE may detect that a cellular connection associated with the application is no longer active and initiate a timer associated with deactivation of the cellular modem (e.g., a debounce timer). Additionally, the UE may detect, after initiation of the timer but prior to expiry of the timer, a network connection request and disable the timer. Further, the UE may, upon expiry of the timer, disable the cellular modem.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for application aware cellular radio activation, comprising:
   a user equipment device (UE),
      operating in a power savings mode in which a cellular modem of the UE is disabled;
      receiving, while in the power savings mode, an indication associated with an application installed on the UE, wherein the indication includes at least an indication of an application state of the application, and wherein the application state is one of a foreground state or a background state;
      receiving, while in the power savings mode, a networking assertion input; and
      determining, based at least in part on the networking assertion input and the application state being the foreground state, to activate the cellular modem to support the application.

2. The method of claim 1, further comprising:
   the UE,
      activating the cellular modem based on the determination.

3. The method of claim 2 wherein the network assertion input comprises a connection attempt, and wherein the connection attempted is determined based on a matching of one of an application bundle identifier (ID), a universally unique identifier (UUID), or a process ID (PID) with one of a network connection bundle ID, UUID, or PID associated with the connection attempt.

4. The method of claim 1,
   wherein the indication further comprises an indication of an application category of the application, and wherein the application category includes one of a preferred application or a non-preferred application.

5. The method of claim 4,
wherein the determination is further based on the application category.

6. The method of claim 1, further comprising:
the UE,
    comparing one of an application bundle identifier (ID), a universally unique identifier (UUID), or a process ID (PID) with one of a network connection bundle ID, UUID, or PID associated with the networking assertion input; and
    determining, based on the comparison, that the networking assertion input originated form the application.

7. The method of claim 1,
wherein the application is an artificial intelligence (AI) assistant of the UE, wherein the foreground state is an active state and the background state is an inactive state; and
wherein determining, based at least in part on the networking assertion input and the application state being the foreground state, to activate the cellular modem to support the application comprises the UE:
    determining that the state of the AI assistant is active; and
    receiving, from the AI assistant, a network connection request.

8. The method of claim 1,
wherein the indication includes at least an indication of proximity information or WiFi state of the UE; and
wherein determining, based at least in part on the networking assertion input and the application state being the foreground state, to activate the cellular modem to support the application comprises the UE:
    determining, based on the indication, that the UE is not in a proximity mode or that the UE is not connected to a local area network via WiFi; and
    activating, based on the determining, the cellular modem, upon detection of a network connection request.

9. An apparatus, comprising:
a memory; and
at least one processor in communication with the memory and configured to:
    operate in a power savings mode in which a cellular modem controlled by the apparatus is disabled;
    receive, while in the power savings mode, an indication associated with an application, wherein the indication includes at least an indication of an application state of the application, and wherein the application state is one of a foreground state or a background state;
    receive, while in the power savings mode, a networking assertion input; and
    determine, based at least in part on the networking assertion input and the application state being the foreground state, to activate the cellular modem to support the application.

10. The apparatus of claim 9:
wherein the at least one processor is further configured to:
    detect that a cellular connection associated with the application is no longer active; and
    initiate a timer associated with deactivation of the cellular modem.

11. The apparatus of claim 10,
wherein the at least one processor is further configured to:
    detect, after initiation of the timer but prior to expiry of the timer, a network connection request; and
    disable the timer.

12. The apparatus of claim 10,
wherein the at least one processor is further configured to:
    upon expiry of the timer, disable the cellular modem.

13. The apparatus of claim 9,
wherein the at least one processor is further configured to:
    determine that the application is a session application based on the indication;
    monitor, while the session application is active, network assertions from a networking layer in communication with the apparatus; and
    determine, based on the monitoring, that there is network connection request from the session application.

14. A user equipment device (UE), comprising:
at least one antenna;
at least one radio in communication with the at least one antenna and configured to communicate according to at least one radio access technology (RAT); and
one or more processors in communication with the at least one radio and configured to cause the UE to:
    operate in a power savings mode in which a cellular modem of the UE is disabled;
    receive, while in the power savings mode, an indication associated with an application installed on the UE, wherein the indication includes at least an indication of an application state of the application, and wherein the application state is one of a foreground state or a background state;
    receive, while in the power savings mode, a networking assertion input; and
    determine, based at least in part on the networking assertion input and the application state being the foreground state, to activate the cellular modem to support the application.

15. The UE of claim 14,
wherein the application is an artificial intelligence (AI) assistant of the UE, wherein the foreground state is an active state and the background state is an inactive state; and
wherein, to determine, based at least in part on the networking assertion input and the application state being the foreground state, to activate the cellular modem to support the application, the one or more processors are further configured to cause the UE to:
    determine that the state of the AI assistant is active; and
    receive, from the AI assistant, a network connection request.

16. The UE of claim 14,
wherein the indication includes at least an indication of proximity information or WiFi state of the UE; and
wherein, to determine, based at least in part on the networking assertion input and the application state being the foreground state, to activate the cellular modem to support the application, the one or more processors are further configured to cause the UE to:
    determine, based on the indication, that the UE is not in a proximity mode or that the UE is not connected to a local area network via WiFi; and
    activate, based on the determining, the cellular modem, upon detection of a network connection request.

17. The UE of claim 14,
wherein the indication further includes one or more timers.

18. The UE of claim 17,
wherein a timer of the one or more timers is a periodic timer; and
wherein the one or more processors are further configured to cause the UE to:
   monitor the periodic timer; and
   upon expiry of the periodic timer, activate the cellular modem.

19. The UE of claim 17,
wherein a timer of the one or more timers is a wakeup timer; and
wherein the one or more processors are further configured to cause the UE to:
   initiate, upon deactivation of the cellular modem, the wakeup timer;
   monitor for activation of the cellular modem; and
   upon detection of activation of the cellular modem, restart the wakeup time.

20. The UE of claim 19,
wherein the one or more processors are further configured to cause the UE to:
   upon expiration of the wakeup timer, activate the cellular modem.

* * * * *